US008760710B2

(12) United States Patent
Muraishi

(10) Patent No.: US 8,760,710 B2
(45) Date of Patent: Jun. 24, 2014

(54) IMAGE FORMING DEVICE AND STARTING METHOD THEREFOR

(75) Inventor: Norio Muraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

(21) Appl. No.: 13/422,336

(22) Filed: Mar. 16, 2012

(65) Prior Publication Data

US 2012/0236324 A1 Sep. 20, 2012

(30) Foreign Application Priority Data

Mar. 18, 2011 (JP) ................................ 2011-061714
Nov. 29, 2011 (JP) ................................ 2011-260575

(51) Int. Cl.

*G06K 15/02* (2006.01)
*G06F 3/14* (2006.01)
*G06K 15/22* (2006.01)
*G03G 15/00* (2006.01)
*G03G 15/01* (2006.01)
*G03G 15/20* (2006.01)

(52) U.S. Cl.

USPC .............. 358/1.2; 358/1.15; 358/1.4; 399/37; 399/39; 399/70; 399/88

(58) Field of Classification Search

None
See application file for complete search history.

(56) References Cited

U.S. PATENT DOCUMENTS 6,072,585 A * 6/2000 Dutton et al. ................ 358/1.12
7,624,288 B2 11/2009 Kishi et al.
7,840,153 B2 11/2010 Semma et al.
2006/0010331 A1* 1/2006 Ohara .......................... 713/323
2008/0002232 A1* 1/2008 Mori ............................ 358/401

FOREIGN PATENT DOCUMENTS

JP 2007-301765 A 11/2007

OTHER PUBLICATIONS

Abstract of JP 2007-301765 published Nov. 22, 2007.

* cited by examiner

*Primary Examiner* — Fred Guillermety
*Assistant Examiner* — Henok A Shiferaw
(74) *Attorney, Agent, or Firm* — Harness, Dickey & Pierce, P.L.C.

(57) ABSTRACT

Disclosed is an image forming device including an engine unit that performs image processing; an engine control unit that controls the engine unit; and a controller that generates items of starting information. The controller transmits a first item of the starting information indicating a cause of the starting process, and transmits a second item of the starting information when a content of the second item of the starting information is fixed. A time period required for fixing the second item of the starting information depends on the cause of the starting process. The engine control unit obtains the second item of the starting information, based on the first item of the starting information and timing information obtained in advance that indicates a timing at which the second item of the starting information is expected to be fixed.

9 Claims, 12 Drawing Sheets

IMAGE FORMING DEVICE AND STARTING METHOD THEREFOR

BACKGROUND OF THE INVENTION

1. Field of the Invention

Embodiments of the present invention relate to an image forming device and a starting method of the image forming device. Specifically, the embodiments relate to an image forming device and a starting method of the image forming device that can reduce start-up time.

2. Description of the Related Art

An image forming device having multiple functions, which is called a multi functional peripheral (MFP), has been known. In the image forming device, functions of devices, such as a printer, a copier, a facsimile machine, and a scanner, are integrated.

For such an image forming device, the reduction of the power consumption during a waiting state is highly desired, in addition to the reduction of the power consumption during an image forming operation. The reduction of the power consumption is achieved by providing an energy-saving mode. During the energy-saving mode, the power supply is stopped for functional blocks other than the minimum required functional blocks.

Further, it is highly desired to reduce waiting time of an operator by reducing the processing time for returning from the energy saving mode to a normal operation mode and for activating the normal operation mode when a main power supply is turned on.

An image forming device, such as an MFP, includes an engine unit, an engine control unit, and a controller. Here, the engine unit performs mechanical operations related to formation of an image, such as reading an original image or forming an image on a recording paper. The engine control unit controls operations performed by the engine unit. The controller integrally controls the whole image forming device.

The controller generates various types of control signals and transmits the control signals to the engine unit by using a communication unit, which utilizes a universal bus or the like that may require establishing a communication connection. Further, the controller transmits information which may be necessary for a starting process of the engine unit (hereinafter, referred to as starting information) to the engine control unit through the communication unit, when the main power supply is turned on, or when the operation mode of the image forming device is returning from the energy saving mode to the normal operation mode. After receiving the starting information, the engine control unit starts the engine unit.

Operations of the controller and the engine control unit at the time in which the main power supply is turned on differ from that of the controller and the engine control unit when the operation mode of the image forming device returns from the energy saving mode to the normal operation mode, depending on whether there are starting operations for the controller and the engine control unit themselves.

Namely, since the controller is not started at the time in which the main power supply is turned on, first the controller starts a starting process of the controller itself. The stating process of the controller itself includes, for example, an initializing process of a CPU. After completing the starting process of the controller itself, the controller establishes a communication connection of the communication unit between the controller and the engine control unit. After the communication connection is established, the engine control unit obtains the starting information from the controller through the communication unit, and performs the starting process. Namely, the engine control unit starts performing the starting process, after the controller is started and the communication connection between the controller and the engine control unit is established.

On the other hand, when the operation mode of the image forming device is returned from the energy saving mode to the normal mode, the controller has already been started. Thus the communication connection of the communication unit between the controller and the engine control unit is immediately established, and the engine control unit obtains the starting information from the controller and starts performing the starting process.

Therefore, there is a problem that the time to wait for the starting process of the engine unit to be completed becomes longer when the main power supply is turned on, compared to a case in which the operation mode of the image forming device returns from the energy saving mode to the normal operation mode.

Patent Document 1 (Japanese Published Unexamined Application No. 2007-301765) discloses an image forming device that addresses this problem. The image forming device includes an information transmission unit, such as a DC level transmitting unit, besides the communication unit between the controller and the engine control unit. The information transmission unit is dedicated for transmitting the starting information and does not require establishing a communication connection. The controller transmits the starting information to the engine control unit through the information transmission unit. Here, the starting information includes information indicating a cause of starting (the main power supply is turned on or the operation mode of the image forming device returns from the energy saving mode to a normal operation mode); information indicating whether an image forming unit in the engine unit is to be started; and information indicating whether an adjustment of the image forming unit is required (here, the information indicating whether elapsed time since the last image formation operation and the last image adjustment operation of the engine unit exceeds a threshold value). When the main power supply is turned on, the engine control unit starts executing a warming control for a fixing device, without waiting for establishing the communication connection of the communication unit between the controller and engine control unit, based on the starting information received through the dedicated information transmission unit. Here, the warming control for the fixing device is a part of the starting process. Similarly, when the operation mode of the image forming unit returns from the energy saving mode to the normal operation mode, based on the starting information received through the dedicated information transmission unit, the engine control unit starts executing a starting process for the image forming unit, depending on the information indicating whether the image forming unit in the engine unit is to be started; and starts executing an adjustment process for the image forming unit, depending on the information indicating whether an adjustment of the image forming unit is required.

Namely, the image forming device reduces the start-up time for the case in which the main power supply is turned on; and reduces the star-up time for the case in which the operation mode of the image forming device is returning from the energy saving mode to the normal operation mode, by performing a part of the starting process of the engine control unit in parallel with the process for establishing the communication connection of the communication unit between the controller and the engine control unit.

The image forming unit disclosed in Patent Document 1 can effectively reduce the time spent from turning on the main power supply to completing the starting process of the engine control unit, provided that the image forming device utilizes a fixing method that requires more time to warm the fixing device, such as a fixing method in which a halogen lamp is utilized for warming the fixing device.

However, for an image forming device which utilizes a fixing method in which the fixing device may be warmed within a short time period, such as a fixing method that utilizes induction heating (IH), the time spent for warming the fixing device is much less than the time spent for adjusting the image forming unit including, for example, an optical system for writing an electrostatic latent image on a photosensitive drum.

The information indicating whether an adjustment of the image forming unit is required is generated by the controller. Thus the time spent for determining the content of the information is longer for the case in which the main power supply is turned on, namely for the case in which the controller is to be started, than that of the case in which the operation mode of the image forming device is returning from the energy saving mode to the normal operation mode, namely, for the case in which the controller has already been started.

Therefore, in the image forming device disclosed in Patent Document 1, the engine control unit obtains the information indicating whether an adjustment of the image forming unit is required through the dedicated information transmission unit, only when the operation mode of the image forming device returns from the energy saving mode to the normal operation mode. On the other hand, when the main power supply is turned on, namely, when the controller is to be turned on, the engine control unit obtains the information indicating whether an adjustment of the image forming unit is required through the communication unit after the communication connection of the communication unit is established. Therefore, in the image forming unit in which the time spent for adjusting the image forming unit is much greater than the starting time of the whole image forming device, the starting time for the case in which the main power supply is turned on may not be effectively reduced.

It is desired to reduce the starting time of the whole image forming device by obtaining, as soon as possible, the information about a particular start-up process that is much greater than the time spent for the starting process of the whole image forming device. However, for some starting information such that the time spent for determining the content of the starting information depends on a cause of the starting, the information about the particular start-up process that is much greater than the time spent for the starting process of the whole image forming device is not always obtained as soon as possible.

SUMMARY OF THE INVENTION

Embodiments of the present invention have been developed in view of the above problem. An objective of the embodiments is to make it possible for an engine control unit included in an image forming device to obtain starting information such that time spent for determining the content of the starting information depends on a cause of the starting, as quickly as possible from the controller, regardless of the cause of the starting. Here, the image forming device includes the engine unit that performs mechanical operations of an image forming process; an engine control unit that controls the operations of the engine unit; and a controller that generates plural items of starting information that may be required for starting processes of the engine control unit, and that transmits the generated items of starting information to the engine control unit through plural information transmission units that do not require establishing communication connections. The information transmission units are dedicated for the corresponding items of starting information.

In one aspect, there is provided an image forming device including an engine unit that performs mechanical operations of image processing; an engine control unit that controls the operations of the engine unit; and a controller that generates plural items of starting information required for a starting process of the engine control unit, and that transmits the plural items of the starting information to the engine control unit using plural information transmission units. Here, the plural information transmission units do not require establishing of communication connections and the plural information transmission units are dedicated for the plural items of starting information. The controller transmits a first item of the starting information indicating a cause of the starting process using a first information transmission unit, and the controller transmits a second item of the starting information using a second information transmission unit when a content of the second item of the starting information is fixed. Here, the first item of the starting information and the second item of the starting information are included in the plural items of the starting information. A time period required for fixing the content of the second item of the starting information depends on the cause of the starting process. The engine control unit obtains the second item of the starting information using the second information transmission unit, based on the first item of the starting information obtained by using the first information transmission unit and timing information indicating a timing at which the second item of the starting information is expected to be fixed. Here, the timing information is obtained in advance.

In another aspect, there is provided a starting method of an image forming device. The image forming device includes an engine unit that performs mechanical operations of image processing; an engine control unit that controls the operations of the engine unit; and a controller that generates plural items of starting information required for a starting process of the engine control unit, and that transmits the plural items of the starting information to the engine control unit using plural information transmission units. Here, the plural information transmission units do not require establishing communication connections and the plural information transmission units are dedicated for the plural items of starting information. The starting method includes a first transmission step, by the controller, of transmitting a first item of the starting information indicating a cause of the starting process using a first information transmission unit, the first item of the starting information being included in the plural items of the starting information; a second transmission step, by the controller, of transmitting a second item of the starting information using a second information transmission unit when a content of the second item of the starting information is fixed, wherein a time period required for fixing the content of the second item of the starting information depends on the cause of the starting process; a first acquisition step, by the engine control unit, of acquiring the first item of the starting information using the first information transmission unit; and a second acquisition step, by the engine control unit, of acquiring the second item of the starting information from the second information transmission unit, based on the first item of the starting information acquired by using the first information transmission unit and timing information indicating a timing at which the second item of the starting information is expected to be fixed, the timing information being acquired in advance.

According to the embodiments, the engine control unit included in the image forming device may obtain the starting information, as quickly as possible from the controller, regardless of the cause of the starting. Here, the time spent for fixing the content of the starting information depends on a cause of the starting. The image forming device includes the engine unit that performs the mechanical operations of the image forming process; the engine control unit that controls the operations of the engine unit; and the controller that generates plural of the items of starting information that may be required for the starting processes of the engine control unit, and that transmits the generated items of starting information to the engine control unit through plural of the information transmission units that do not require establishing the communication connections. Each of the information transmission units is dedicated for the corresponding item of starting information.

Other objects, features and advantages of the present invention will become more apparent from the following detailed description when read in conjunction with the accompanying drawings.

DETAILED DESCRIPTION OF THE PREFERRED EMBODIMENTS

Hereinafter, embodiments of the present invention are explained by referring to accompanying figures.

First Embodiment

<Configuration of Image Forming Device>

Figure 1:
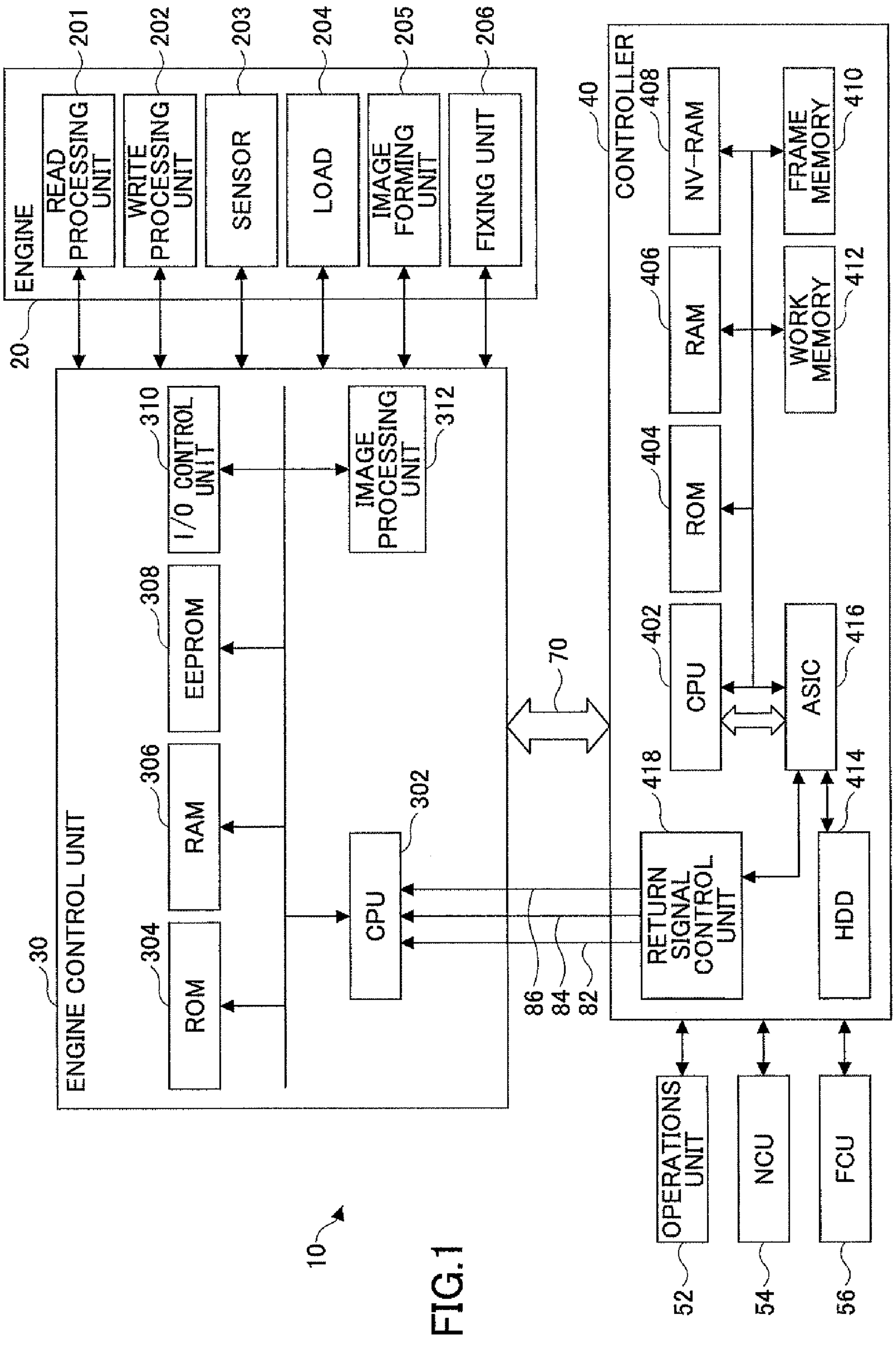
FIG. 1 is a block diagram showing a configuration of an image forming device according to a first embodiment.

FIG. 1 is a block diagram showing a configuration of an image forming device 10 according to a first embodiment.

The image forming device 10 includes an engine 20, an engine control unit 30, and a controller 40. The engine 20 performs mechanical operations of an image forming process. The engine control unit 30 controls operations of the engine 20. The controller 40 integrally controls the whole image forming device 10.

The engine control unit 30 and the controller 40 are connected to a communication bus 70, which conforms to a communication standard called "PCI Express (registered trademark)" (hereinafter, the communication bus 70 is referred to as a PCIe communication bus 70), and communicate with each other through the PCIe communication bus 70.

The controller 40 is connected to an operations unit 52, a network control unit (NCU) 54, and a facsimile control unit (FCU) 56. The operations unit 52 is for an operator to input instructions or the like to the controller 40. The NCU 54 performs a communication process with an external device through a public communication network. The FCU 56 performs a facsimile transmitting process and a facsimile receiving process through the public communication network.

The engine 20 includes a read processing unit 201, a write processing unit 202, a sensor 203, a load 204, an image forming unit 205, and a fixing unit 206. The read processing unit 201 reads an original image by operating a scanner (not shown). The write processing unit 202 writes an electrostatic latent image on a photosensitive drum (not shown) of the image forming unit 205. The sensor 203 is, for example, a conveyance path sensor that detects the presence or absence of a recording paper on a paper conveyance path, or a door sensor that detects opening and closing of an access door provided in the image forming device 10. The load 204 is, for example, a motor, a solenoid, and a clutch, which are controlled in response to an output from the sensor 203. The image forming unit 205 develops an electrostatic latent image formed on the photosensitive drum, and forms an image on a recording paper by transferring the developed electrostatic latent image onto the recording paper. The fixing unit 206 fixes the image that has been transferred onto the recording paper by heating.

Further, the image forming unit 205 includes a charging unit that causes the photosensitive drum to be charged, a developing unit 104 (see FIG. 7) that causes toner to be adhered to the electrostatic latent image on the photosensitive drum, and a transferring unit that transfers the toner on the photosensitive drum onto the recording paper. Further, the fixing unit 206 includes a fixing roller that heats and fixes the toner transferred onto the recording paper, and a pressing roller that presses the recording paper to the fixing roller.

The engine control unit 30 is a computer that controls the engine 20, and includes a central processing unit (CPU) 302, a read only memory (ROM) 304, a random access memory (RAM) 306, an electrically erasable programmable ROM (EEPROM) 308, an input/output (I/O) control unit 301, and an image processing unit 312. The ROM 304 stores programs. The RAM 306 is for temporarily storing data. The EEPROM 308 stores adjustment values and the like that are used for controlling the engine 20. The I/O control unit 310 controls the load 204 while referring to an output from the sensor 203. The image processing unit 312 performs, for example, a modulation transfer function (MTF) (spatial frequency) correction, and an image quality correction.

The controller 40 is a computer that controls the whole image forming device 10. The controller 40 includes a CPU 402; a ROM 404 that stores a program for controlling; a RAM 406 that is a memory to be utilized by the CPU 402; and a non-volatile RAM (NV-RAM) 408. The NV-RAM 408 may have, for example, a lithium battery and a clock, and stores a content that has been stored by the RAM 406, when the power is turned off.

Further, the controller 40 includes a frame memory 410; a work memory 412; a hard-disk drive (HDD) (a fixed disk device) 414; a system bus; and an application specific integrated circuit (ASIC) 416. The frame memory 410 is used for temporarily storing image data. The work memory 412 is for storing a program that has been downloaded from the ROM 404, so that the program may be executed by the CPU 402. The HDD 414 stores, for example, image data. The system bus connects the above described components. The ASIC 416 performs the communication control through the system bus and the operational control of the frame memory 410.

Further, the controller 40 includes a return signal control unit 418 that outputs starting information that may be required for a starting process of the engine control unit 30 to the CPU 302 of the engine control unit 30.

The information outputs from the return signal control unit 418 is transmitted to the CPU 302 of the engine control unit 30 through dedicated signal lines 82, 84, and 86. The dedicated signal lines 82, 84, and 86 indicate specific starting information that may be required for the starting process of the engine control unit 30 by outputting low level voltage signals and/or high level voltage signals.

Contents of the starting information indicated by the output signals from the dedicated signal lines 82, 84, and 86 may be defined in advance. Namely, for example, the dedicated signal line 82 may indicate whether a starting process is caused by the main power supply being turned on. The dedicated signal line 84 may indicate whether elapsed time since the completion of the last image forming operation (hereinafter, referred to as the image formation stopping time) reaches a predetermined time period. The dedicated line 86 may indicate whether a cause of returning from an energy saving mode to a normal operation mode (hereinafter, referred to as the return from energy-saving) is a request from the NCU 54.

The return signal control unit 418 generates the starting information based on an input content from the operations unit 52 or information received by the NCU 54 or the FCU 56, such as a print request, and transmits the starting information to the CPU 302 of the engine control unit 30 through the dedicated lines 82, 84, and/or 86.

<Starting Process of Image Forming Device>

Next, an operation procedure of the starting process of the image forming device 10 is explained in series by separating the starting process of the controller 40 and the starting process of the engine control unit 30.

(1) Starting Processes in Controller 40

The starting processes of the controller 40 include a starting process when the main power supply is turned on (the starting process during turning on) and a starting process when the operation mode of the image forming device 10 is returned from an energy saving mode to a normal operation mode (the starting process during returning).

Figure 2:
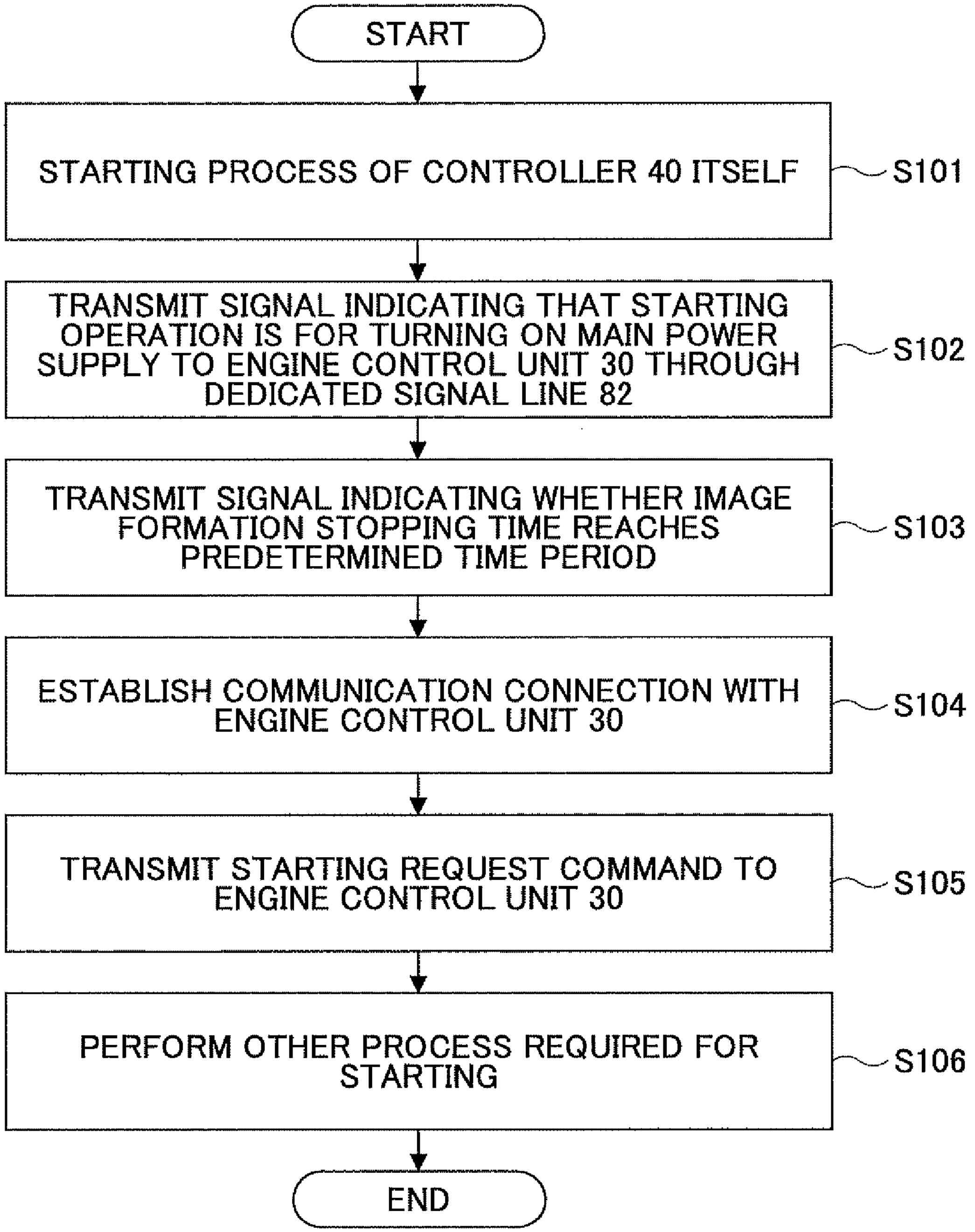
FIG. 2 is a flowchart showing a procedure of a starting process for a case in which a main power supply is turned on, the starting process being performed by a controller in the image forming device according to the first embodiment.

The procedure of the starting process during turning on is explained in accordance with the flowchart shown in FIG. 2. The flow is started when the operator turns on the main power supply of the image forming device 10.

First, the CPU 402 of the controller 40 downloads a starting process program stored, for example, in the HDD 414 into the work memory 412 in accordance with the program stored in the ROM 404, and performs the starting process of the controller 40 itself (S101), such as an initial setting of the CPU 402.

Next, the controller 40 transmits a signal from the return signal control unit 418 to the CPU 302 of the engine control unit 30 through the dedicated signal line 82 (S102). Here, the signal indicates that the starting operation is for the time in which the main power supply is turned on.

Subsequently, the controller 40 generates information indicating whether the image formation stopping time reaches the predetermined time period (hereinafter, referred to as the stopping time information) based on information about the time, at which a previous image formation operation has been completed, stored in the NV-RAM 408, and information about the current time generated by the clock (not shown), and transmits the information to the CPU 302 of the engine control unit 30 (S103) through the dedicated line 84.

Further, the controller 40 transmits a starting command for instructing the engine control unit 30 to perform the starting operation (S105), after establishing a communication connection with the engine control unit 30 through the PCIe communication bus 70 (S104). The controller terminates the starting process during turning on, after performing other processes which may be required for the starting process of the engine control unit 30 (S106), such as responding to an inquiry for the starting information from the engine control unit 30 (the inquiries other than the starting information provided by the dedicated lines 82, 84, and 86). Here, the starting of step S104 may be executed in parallel with steps S102 and S103.

Figure 3:
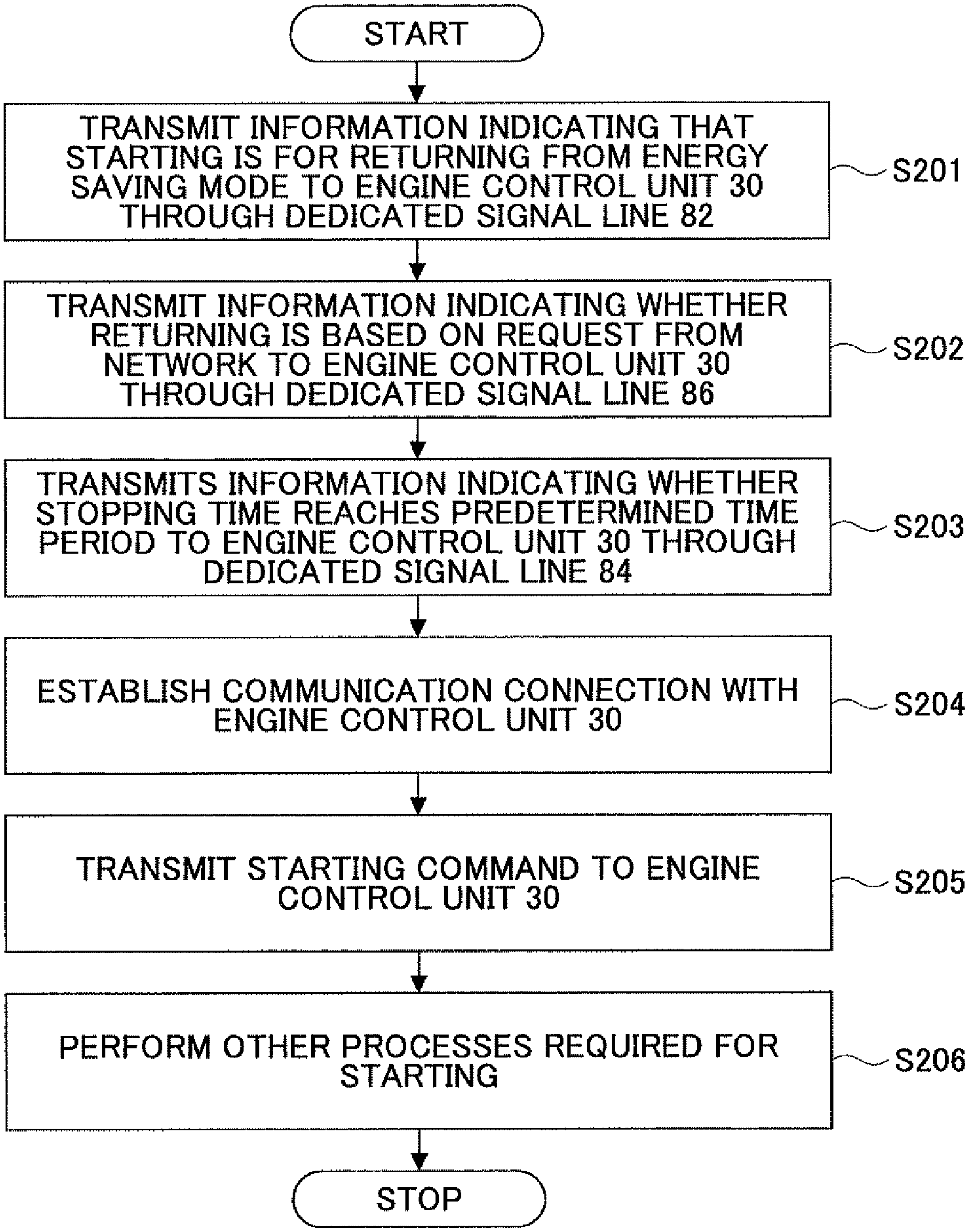
FIG. 3 is a flowchart showing a procedure of a starting process for a case in which an operation mode of the image forming device returns from an energy saving mode to a normal operation mode, the starting process being performed by the controller in the image forming device according to the first embodiment.

Next, the starting process during returning is explained in accordance with the flowchart shown in FIG. 3. Incidentally, the operation mode of the image forming device 10 is transferred to the energy saving mode when a first predetermined time period has passed since the last operation on the operations unit 52, or when an operation request (for example, a printing request) through the NCU 54 has not been received for more than a second predetermined time period. Further, after the operation mode of the image forming device 10 has been transferred to the energy saving mode, the operation mode of the image forming device 10 returns to the normal operation mode when the NCU 54 receives an operation request, or when the operator operates the operations unit 52.

When the starting process during returning is started, the controller 40 transmits the information indicating that the starting process is for the time of returning from the energy saving mode to the CPU 302 of the engine control unit 30 (S201). Subsequently, the controller 40 transmits the information indicating whether the cause of the returning from the energy saving mode is based on the NCU having received an operation request from the network to the CPU 302 of the engine control unit 30 (S202).

Further, the controller 40 generates the stopping time information, namely, the information indicating whether the image formation stopping time reaches the predetermined time period, and transmits the stopping time information to the CPU 302 of the engine control unit 30 through the dedicated signal line 84 (S203).

Subsequently, the controller 40 establishes the communication connection with the engine control unit 30 through the PCIe communication bus 70 (S204), and transmits a starting command to the engine control unit 30 (S205). Here, the starting command instructs the engine control unit 30 to start the starting process. After that, the controller 40 performs other processes that may be required for the starting process (S206), such as responding to an inquiry for the starting information from the engine control unit 30, and terminates the starting process during returning.

(2) Starting Process at Engine Control Unit 30

Figure 4:
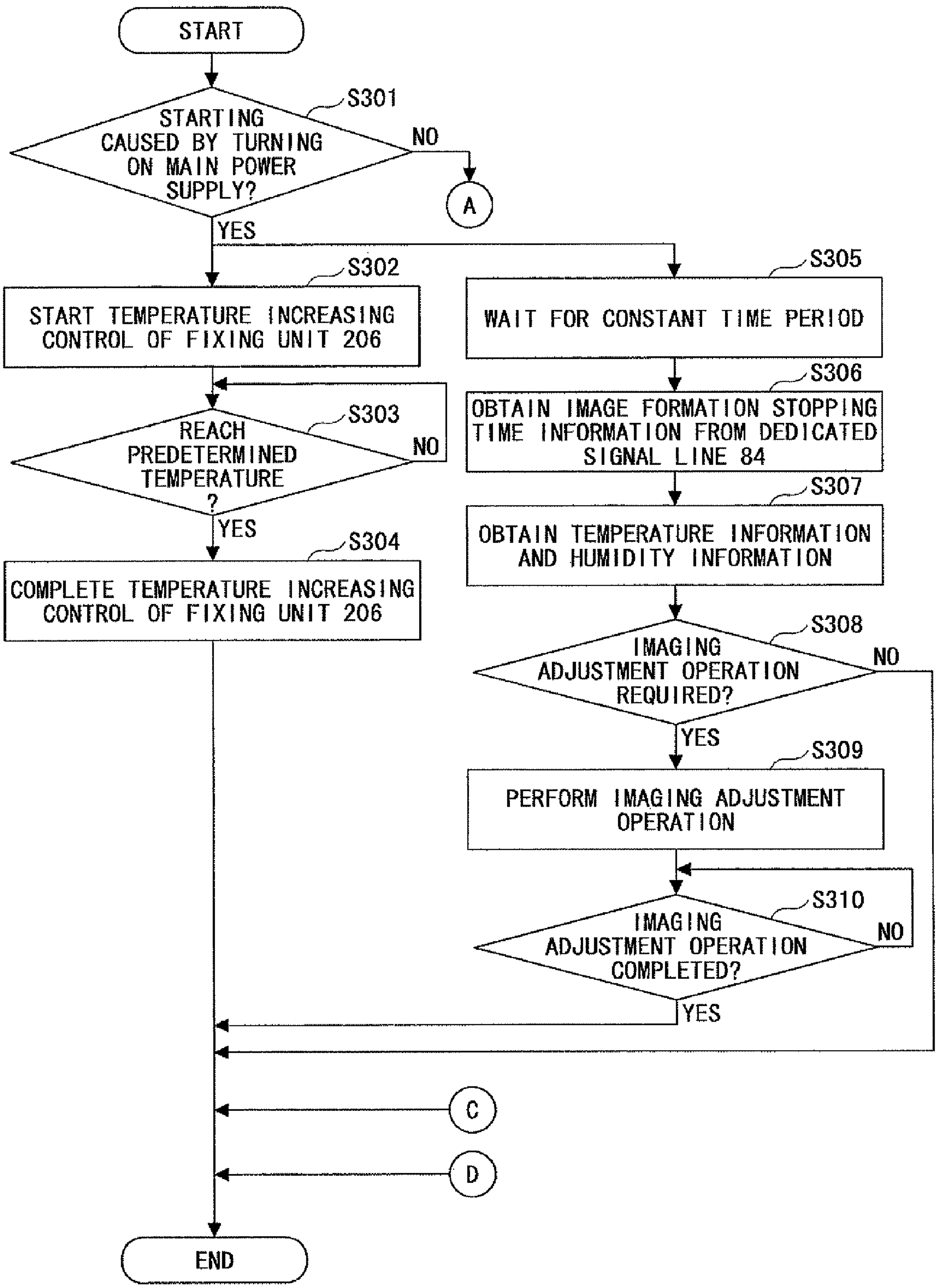
FIG. 4 is a flowchart showing a procedure of a starting process, which is performed by an engine control unit in the image forming device according to the first embodiment.
Figure 5:
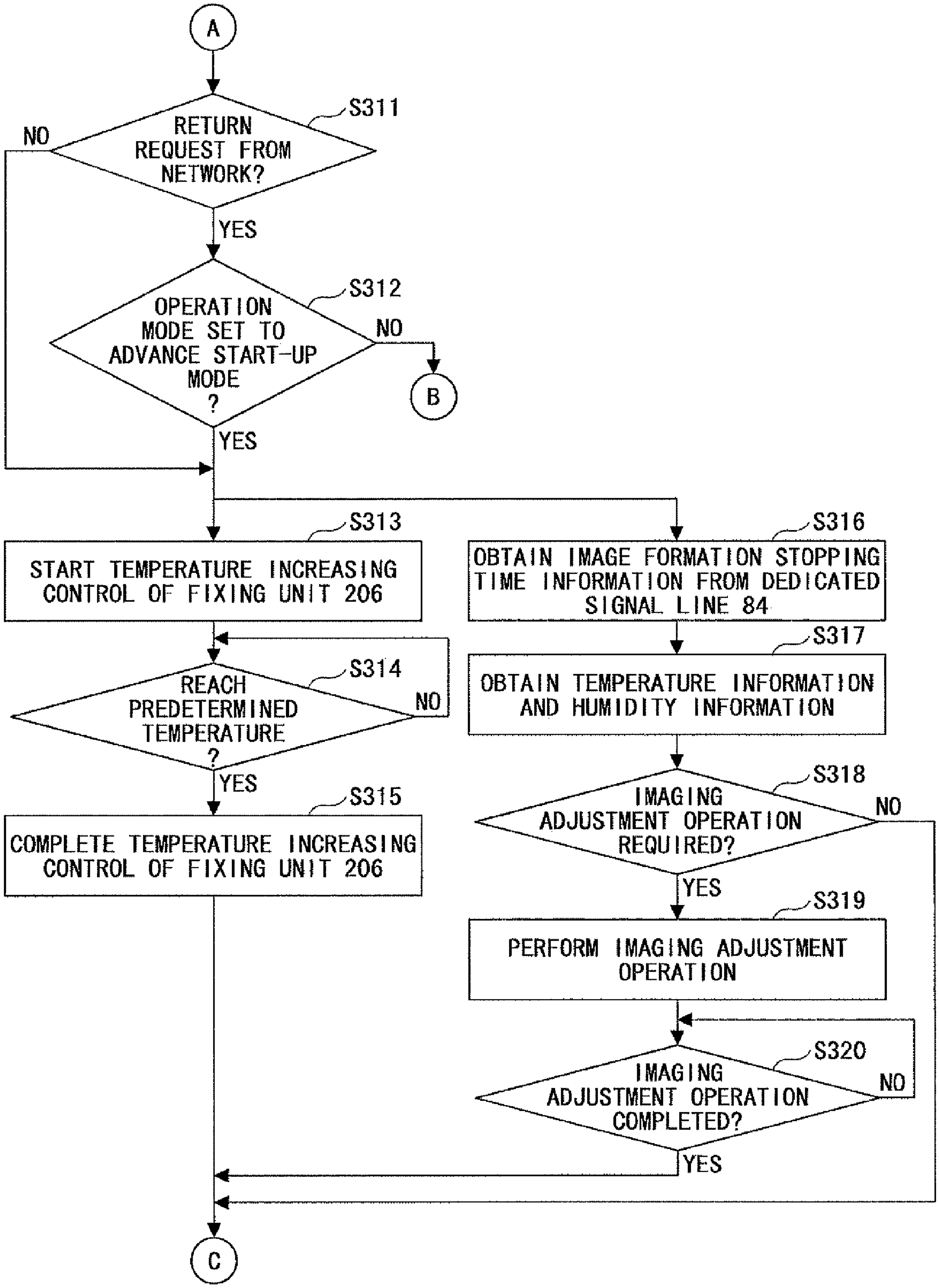
FIG. 5 is a flowchart showing a procedure in the starting process shown in FIG. 4, in a case in which the starting is not caused by turning on the main power supply.
Figure 6:
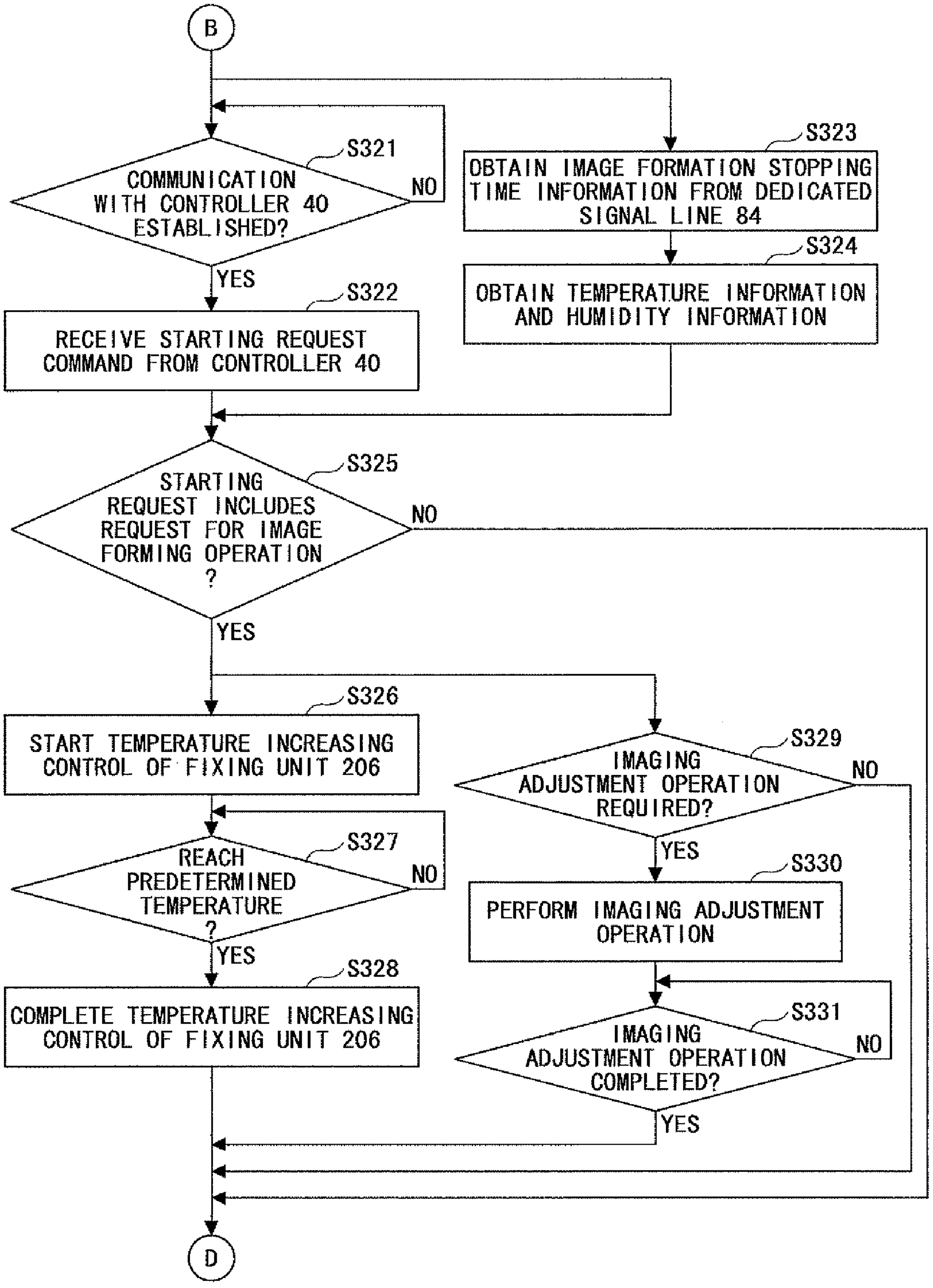
FIG. 6 is a flowchart showing a procedure in the starting process shown in FIG. 5, in a case in which the operation mode is not set to an advance start-up mode.

Next, the starting process at the engine control unit 30 is explained in accordance with the flowcharts shown in FIGS. 4 through 6. Here, FIG. 4 is the flowchart indicating the starting process performed by the engine control unit 30 in the image forming device 10. FIG. 5 is the flowchart indicating a procedure for the time other than the time when the main power supply is turned on, in the starting process shown in FIG. 4. FIG. 6 is a flowchart diagram showing a procedure when the operation mode of the image forming device 10 is not set to an advance start-up mode in the starting process shown in FIG. 5.

The engine control unit 30 starts the starting process, for example, when electricity to the engine control unit 30 is turned on. Further, the electricity to the engine control unit 30 is also turned on when the operator turns on the main power supply of the image forming device 10. Additionally, when the operation mode of the image forming device 10 transfers to the energy saving mode and, subsequently, the energy saving mode is terminated and the operation mode of the image forming device 10 returns to the normal operation mode, a power supply unit (not shown) that has received an instruction from the controller 40 turns on the electricity to the engine control unit 30.

When the engine control unit 30 starts the starting process, the CPU 302 obtains information indicating whether the starting process is caused by the main power unit being turned on. Then the CPU 302 determines whether the starting process is caused by the main power supply being turned on (S301).

Here, the above described "signal indicating whether the starting process is caused by the main power supply being turned on" is output at step S102 in FIG. 2 (the starting process is caused by the main power supply being turned on) or at step S201 in FIG. 3 (the starting process when the operation mode of the image forming device 10 returns from the energy saving mode).

When the engine control unit 30 determines that the starting process is for a case in which the operation mode of the image forming device 10 returns from the energy saving mode (S301: NO), the process transfers to a path indicated by "A." The processes that follow the path indicated by "A" are described below using FIG. 5. On the other hand, when the engine control unit 30 determines that the starting process is caused by the main power supply being turned on (S301: YES), the engine control unit 30 starts temperature increasing control of the fixing unit 206, so as to increase the temperature of the fixing unit 206 (S302). When the temperature of the fixing unit 206 reaches a predetermined temperature (a constant temperature defined in advance) (S303: YES), the engine control unit 30 terminates increasing the temperature of the fixing unit 206. In this manner, the temperature increasing control (the starting control) of the fixing unit 206 is completed (S304).

Further, the engine control unit 30 performs an adjusting operation of the image forming unit 205 (hereinafter, referred to as the imaging adjustment operation) in parallel with the temperature increasing control (S302, S303) of the fixing unit 206. The details of the imaging adjustment operation are described later using FIGS. 7 and 8.

The CPU 302 obtains the stopping time information through the dedicated signal line 84 so as to determine whether it is necessary to perform the imaging adjustment operation. As described in the above explanation of FIG. 2, the stopping time information is fixed, when the controller 40 calculates the stopping time based on the time information from the clock function included in the controller 40 and determines whether the stopping time reaches the predetermined time period. Therefore, a constant time period may be required until the content of the stopping time information is fixed. Thus the engine control unit 30 waits for the constant time period that has been estimated in advance (the time period within which the content of the information is expected to be fixed) (S305). Then the engine control unit 30 reads out the information from the dedicated signal line 84, after the constant time period has passed. In this manner, the engine control unit 30 obtains the stopping time information (S306).

After obtaining the stopping time information from the dedicated signal line 84, the engine control unit 30 obtains information about temperature and information about humidity (S307). Here, the information about the temperature and the information about the humidity are additional execution conditions of the imaging adjustment operation. Then, based on the stopping time information, the information about the temperature, and the information about the humidity, the engine control unit 30 determines whether the imaging adjustment operation is required (S308).

When the engine control unit 30 determines that the imaging adjustment operation is not required (S308: NO), the control unit 30 completes the starting operation of the engine control unit 30, after waiting for the completion of the temperature increasing control of the fixing unit 206 (S304). On the other hand, when the engine control unit 30 determines that the image adjustment operation is required (S308: YES), the engine control unit 30 performs the imaging adjustment operation (S309). Then the starting operation of the engine control unit 30 is completed, after waiting for the completion of the imaging adjustment operation (S310: YES) and the completion of the temperature increasing control of the fixing unit 206 (S304).

Next, the case is explained using FIG. 5, where the engine control unit 30 determines that the starting process is for the case in which the operation mode of the image forming device 10 returns from the energy saving mode (S301: NO). First, the CPU 302 of the engine control unit 30 determines whether the return request is from the network, based on the information from the dedicated signal line 86 of the return signal control unit 418 (S311).

When the CPU 302 of the engine control unit 30 determines that the return request is from the network (S311: NO), the process proceeds to a starting process of the temperature increasing control of the fixing unit 206 (S313) and an acquisition process for acquiring the stopping time information (S316), without performing the determination process of determining whether the operation mode of the image forming device 10 is set to the advance start-up mode (S312) (details of the advance start-up mode are explained later).

When the CPU 302 of the engine control unit 30 determines that the return request is from the network (S311: YES), the CPU 302 of the engine control unit determines whether the operation mode of the image forming device 10 is set to the advance start-up mode (S312). Here, the advance start-up mode can be selected based on a request from the operator.

The advance start-up mode is an operation mode of the image forming device 10 such that, when there is a return request from the network, the temperature increasing control of the fixing unit 206 is started regardless of the cause of the returning (regardless of whether the cause is a request for printing or a request for scanning). Namely, the advance start-up mode is the operation mode of the image forming device 10 to reduce the time for completing printing, when the printing is requested. However, in the advance start-up mode, the image forming device 10 consumes unnecessary power by supplying the power to the fixing unit 206, even if the request is only for the scanning. Therefore, the advance start-up mode may be selected based on the request from the operator.

When the CPU 302 of the engine control unit 30 determines that the operation mode of the image forming device 10 is not set to the advance start-up mode (S312: NO), the process transfers to the path indicated by "B." The processes that follow the path indicated by "B" are explained later by using FIG. 6. When the engine control unit 30 determines that the operation mode of the image forming device 10 is set to the advance start-up mode (S312: YES), the process proceeds to the starting process of the temperature increasing control of the fixing unit 206 (S313) and an acquisition process of acquiring the stopping time information from the dedicated signal line 84 (S316).

When the temperature increasing control of the fixing unit 206 is started (S313) and the temperature of the fixing unit reaches a predetermined temperature (S314: YES), the engine control unit 30 terminates the temperature increasing control, and the temperature increasing control of the fixing unit 206 is completed (S315). The processes from S313 to S315 in FIG. 5 are the same as those from S302 to S304 in FIG. 4.

Further, the engine control unit 30 performs the imaging adjustment operation depending on whether the imaging adjustment operation is required, in parallel with the temperature increasing operation (S313, S314) of the fixing unit 206. In the starting process at the time of turning on the main switch, which has been explained using FIG. 4, the engine control unit 30 reads the dedicated signal line 84 and obtains the stopping time information (S306), after waiting for the constant time (S305). However, when the operation mode of the image forming device 10 returns from the energy saving mode, the controller 40 is operating and controlling the output signal of the dedicated signal line 84 in real time. Therefore, the engine control unit 30 can obtain the stopping time information without waiting.

After obtaining the stopping time information from the dedicated signal line 84, the engine control unit 30 obtains the information about temperature and the information about humidity, which are the additional execution conditions of the imaging adjustment operation (S317). Then the engine control unit 30 determines whether the imaging adjustment operation is required, based on the stopping time information, the information about the temperature, and the information about the humidity (S318).

When the engine control unit 30 determines that the imaging adjustment operation is not required (S318: NO), the engine control unit 30 waits for the completion of the temperature increasing control (S315) for the fixing unit 206, and the starting process of the engine control unit 30 is completed. On the other hand, when the engine control unit 30 determines that the imaging adjustment operation is required (S318: YES), the engine control unit 30 executes the imaging adjustment operation (S319), and waits for the completion of the imaging adjustment operation (S320: YES) and the completion of the temperature increasing control for the fixing unit 206 (S315). Then the starting process of the engine control unit 30 is completed. The processes from S316 to S320 in FIG. 5 are the same as those from S306 to S310 in FIG. 4.

Next, the case in which the operation mode of the image forming device 10 is not set to the advance start-up mode (S312: NO) is explained using FIG. 6. As shown in FIG. 6, the CPU 302 of the engine control unit 30 waits for the establishment of the communication connection between the controller 40 and the engine control unit 30 (S321). After receiving a starting command from the controller 40 (S322), the engine control unit 30 determines whether the starting command is a command for a starting operation with an image forming operation, namely, whether an operation of the image forming unit 25 is required (S325).

Further, in parallel with the above described processes of S321 and S322, the engine control unit 30 obtains the stopping time information from the dedicated signal line 84 of the return signal control unit 418 (S323), and obtains the information about the temperature and the information about the humidity (S324), which are the additional execution conditions of the imaging adjustment operation.

When the engine control unit 30 determines, at step S325, that the image forming operation is required (S325: YES), the process proceeds to a starting operation of increasing the temperature of the fixing unit 206. When the temperature of the fixing unit 206 reaches a predetermined temperature (S327: YES), the engine control unit 30 terminates the temperature increasing control for the fixing unit 206, and the temperature increasing control of the fixing unit 206 is completed (S328). The processes from S326 to S328 in FIG. 6 are the same as those from S302 to S304.

Further, the engine control unit 30 performs the imaging adjustment operation depending on whether it is required, in parallel with the temperature increasing operation of the fixing device 206 (from S326 to S328). When the engine control unit 30 determines, at S329, that the imaging adjustment operation is not required (S329: NO), the engine control unit 30 waits for the termination of the temperature increasing control (S328), and the starting operation of the engine control unit 30 is completed. On the other hand, when the engine control unit 30 determines that the imaging adjustment operation is required (S329: Yes), the engine control unit 30 performs the imaging adjustment operation (S330), and waits for the completion of the imaging adjustment operation (S331: Yes) and the completion of the temperature increasing control for the fixing unit 206 (S328). Then the starting process of the engine control unit 30 is completed.

<Imaging Adjustment Operation>

Figure 7:
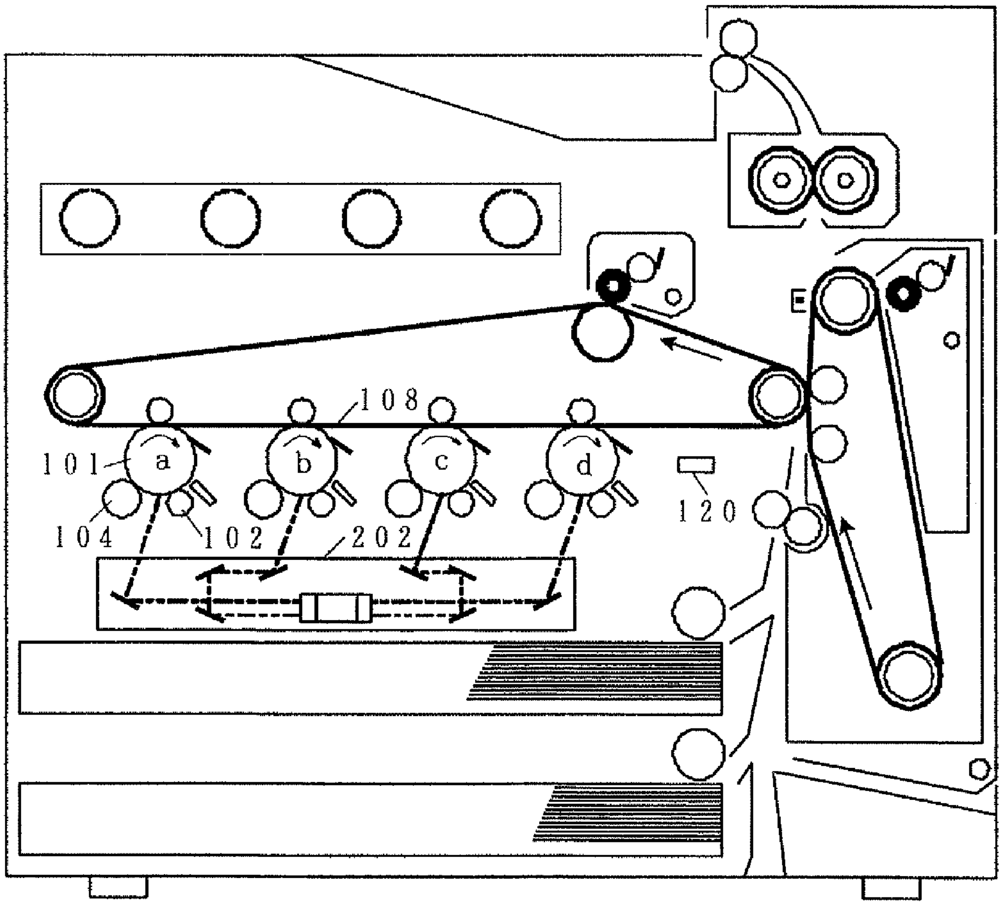
FIG. 7 is a diagram showing schematic configurations of a write processing unit, an image forming unit, and a fixing unit.
Figure 8:
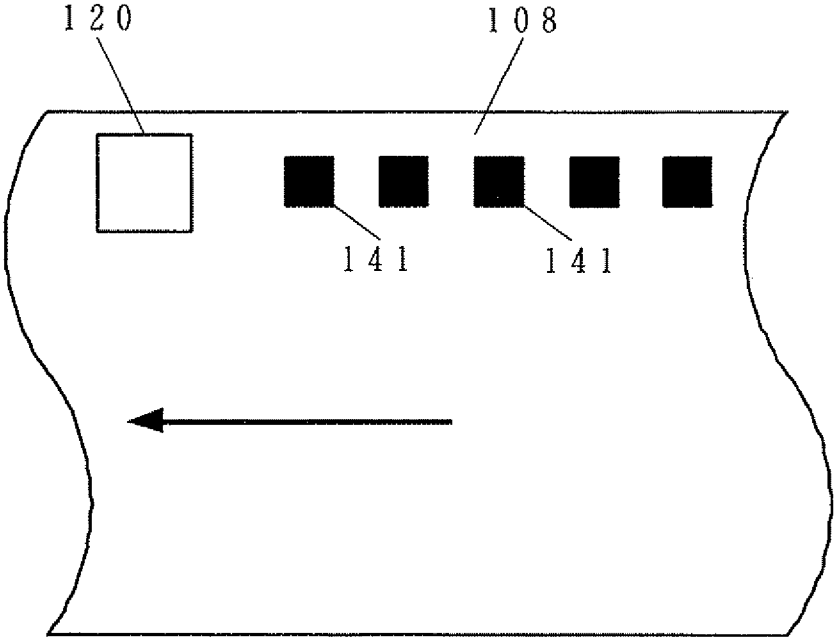
FIG. 8 is a diagram showing alignment patterns for forming an image, which are formed on a transfer belt.

Next, the imaging adjustment operation is explained using FIGS. 7 and 8. Here, FIG. 7 is a diagram showing a schematic configuration of the write processing unit 202, the image forming unit 205, and the fixing unit 206. FIG. 8 is a diagram showing an alignment pattern for forming an image, which is formed on a transfer belt 108 in FIG. 7.

The image adjustment includes an image density adjustment and an image position adjustment. Both the image density adjustment and the image position adjustment are performed based on toner images formed on the transfer belt 108 as an image supporting body. Namely, when the image forming device 10 performs the image density adjustment and the image position adjustment, the image forming device 10 forms the toner images 14 (FIG. 8) on the transfer belt 108 (FIGS. 7 and 8) at predetermined timings, separately from the normal image forming operation.

The image density adjustment (the first adjustment process) is performed as follows. First, the toner images (plural patch patterns) 141 are formed on a photosensitive drum 101. Here, the toner images 141 are formed on the photosensitive drum 101 by a charging process with the charging unit 102, an exposing process with the write processing unit 202, and a development process with the developing unit 104.

Subsequently, the toner images 141 formed on the photosensitive drum 101 are transferred onto the transfer belt 108. Here, the toner images 141 as the plural patch patterns are formed at an end portion in a width direction of the transfer belt 108. The toner images 141 are formed at the position, where an optical sensor 120 can detect the toner images 141. Further, the toner images 141 are formed while varying a developing bias, so that image densities of the corresponding toner images are gradually varied.

Further, the toner images 141 sequentially pass through the position of the optical sensor 120, when the transfer belt 108 moves in the direction indicated by the arrow in FIG. 8. Here, the densities of the corresponding toner images are different from each other. Then the optical sensor 120 detects the densities of the corresponding toner images 141.

The optical sensor 120 includes a light emitting element and a light receiving element. The optical sensor 120 detects a density of an image based on an intensity of reflected light from an object to be detected (in this case, the toner images 141).

After detecting the densities of the corresponding toner images 141, the detection result by the optical sensor 120 is transmitted to the engine control unit 30 (FIG. 1). The engine control unit 30 obtains a relationship between the densities of the images and a related image forming condition, based on the transmitted detection result. Specifically, the engine control unit 30 calculates a regression line that shows the variation of the image density when the developing bias is varied. Then, based on the calculated result, ultimately, the engine control unit 30 determines the image forming conditions for obtaining the optimum image density (the target image density). Finally, the engine control unit 30 adjusts at least one of the developing bias, the charging voltage, and the potential of the latent image, based on the determined image forming conditions.

The image position adjustment (the second adjustment process) is performed as follows. First, plural toner images are formed on the photosensitive drum 101, similar to the case of the image density adjustment process (the first adjustment process). Here, the toner images formed on the photosensitive drum 101 are different from those the toner images formed during the image density adjustment process. Namely, the toner images are formed while the developing bias is fixed.

Incidentally, as the toner images formed during the image position adjustment, unlike the embodiment, toner images having a finer pitch than the pitch of the toner images for the image density adjustment may be used. Further, toner images having a parallelogram shape may be used, in addition to toner images having a rectangular shape. Further the toner images may be formed at both end portions in the width direction of the transfer belt 108, and the toner images may be detected by two optical sensors 120 arranged at the corresponding end portions of the transfer belt 108. In such a case, an adjustment amount of a skew adjustment motor may be determined, based on the detection results.

Subsequently, the toner images 141 formed on the photosensitive drum 101 are transferred onto the transfer belt 108. Then the plural toner images sequentially pass through the position of the optical sensor 120 by the movement of the transfer belt 108 in the direction of the arrow in FIG. 8. Here, the plural toner images 141 are evenly spaced apart.

Then the positions of the toner images are detected by the optical sensor 120. To be more specific, the optical sensor 120 detects, for example, distances between toner images and inclinations of the toner images.

After that, the detection result of the optical sensor 120 is transmitted to the engine control unit 30. The engine control unit 30 calculates positional shifts of the toner images on the transfer belt 108, based on the transmitted detection result. Then the engine control unit 30 ultimately determines an image forming position for obtaining optimum images without positional shifts, based on the calculated result. Finally, the engine control unit 30 adjusts at least one of the timing for writing a latent image and the timing for moving the transfer belt 108, based on the determined image forming position.

Here, when both the image density adjustment (the first adjustment process) and the image position adjustment (the second adjustment process) described above are performed, the image position adjustment is performed earlier. Further, during the time period between the image position adjustment and the image density adjustment, the developing unit 104 is driven without stopping. This is because, the toner images 141 formed during the image position adjustment are for detecting their positions, and consequently, the variation in the image density due to an unstable developer in the developing unit 104 does not affect the image position adjustment.

Contrary to this, the toner images 141 formed during the image density adjustment are for determining an image forming condition based on their image densities. Therefore, the image density adjustment may be performed, after the developer in the developing unit 104 is sufficiently stabilized.

In the embodiment, since the developing unit 104 is driven during the image position adjustment, which is performed earlier, when the image density adjustment is started, a toner charging amount and the toner density are sufficiently stabilized. In this manner, the plural adjustment controls are efficiently performed at a high precision.

As described above, according to the image forming device 10, regardless of the cause of the starting of the image forming device 10, the engine control unit 30 obtains the stopping time information, prior to the connection of the PCIe communication bus 70 being established. Here, the time spent for fixing the stopping time information depends on the cause of the starting of the image forming device 10. Further, the engine control unit 30 may perform the imaging adjustment operation in parallel with the establishing of the connection of the PCIe communication bus 70. The imaging adjustment operation is a predominant factor of the time for the starting process of the whole image forming device 10. Therefore, the waiting time for the operator of the image forming device 10 may be decreased by reducing the starting time of the whole image forming device 10, regardless of the cause of the starting of the image forming device 10.

Further, the advance start-up mode is provided, so as to start the temperature increasing control of the fixing unit 206 when the engine control unit 30 receives the return request from the network, regardless of whether the image forming unit 205 is utilized (whether the request is the request for printing or the request for scanning). Therefore, the printing completion time may be reduced, when the printing is requested.

Further, the advance start-up mode may be set depending on the demand of the operator. Therefore, when the image forming unit 205 is not utilized, such as in the case in which only the scanning is requested, the unnecessary consumption of the power due to supplying the power to the fixing unit 206 may be prevented.

Second Embodiment

<Configuration of Image Forming Device>

Figure 9:
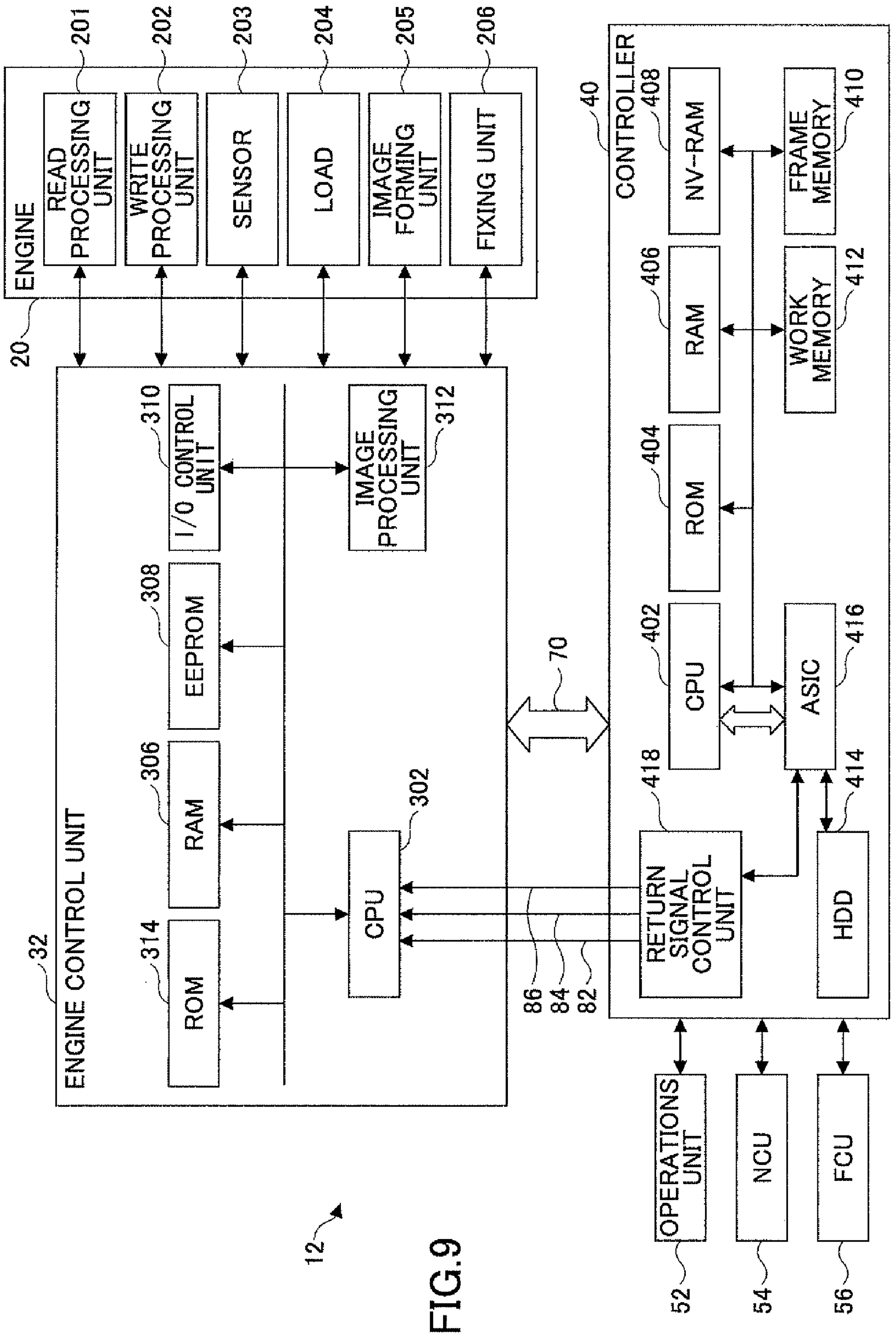
FIG. 9 is a block diagram showing a configuration of an image forming device according to a second embodiment.

FIG. 9 is a block diagram showing a configuration of an image forming device 12 according to a second embodiment. In FIG. 9, the same reference numerals as the reference numerals in FIG. 1 are used for the portions of the image forming device 12, which are the same as the corresponding portions of the image forming device 10 according to the first embodiment in FIG. 1.

The image forming device 12 according to the second embodiment has the configuration similar to the configuration of the image forming device 10 according to the first embodiment. However, the image forming device 12 according to the second embodiment is different from the image forming device 10 according to the first embodiment in a point that the image forming device 12 includes an engine control unit 32 having a ROM 314 that stores a start-up program, instead of the engine control unit 30 in the first embodiment. Here, the start-up program stored in the ROM 314 is different from the programs stored in the ROM 304 of the first embodiment. Therefore, an explanation of other configurations of the image forming device 12 according to the second embodiment is omitted.

<Starting Process of Image Forming Device>

Figure 10:
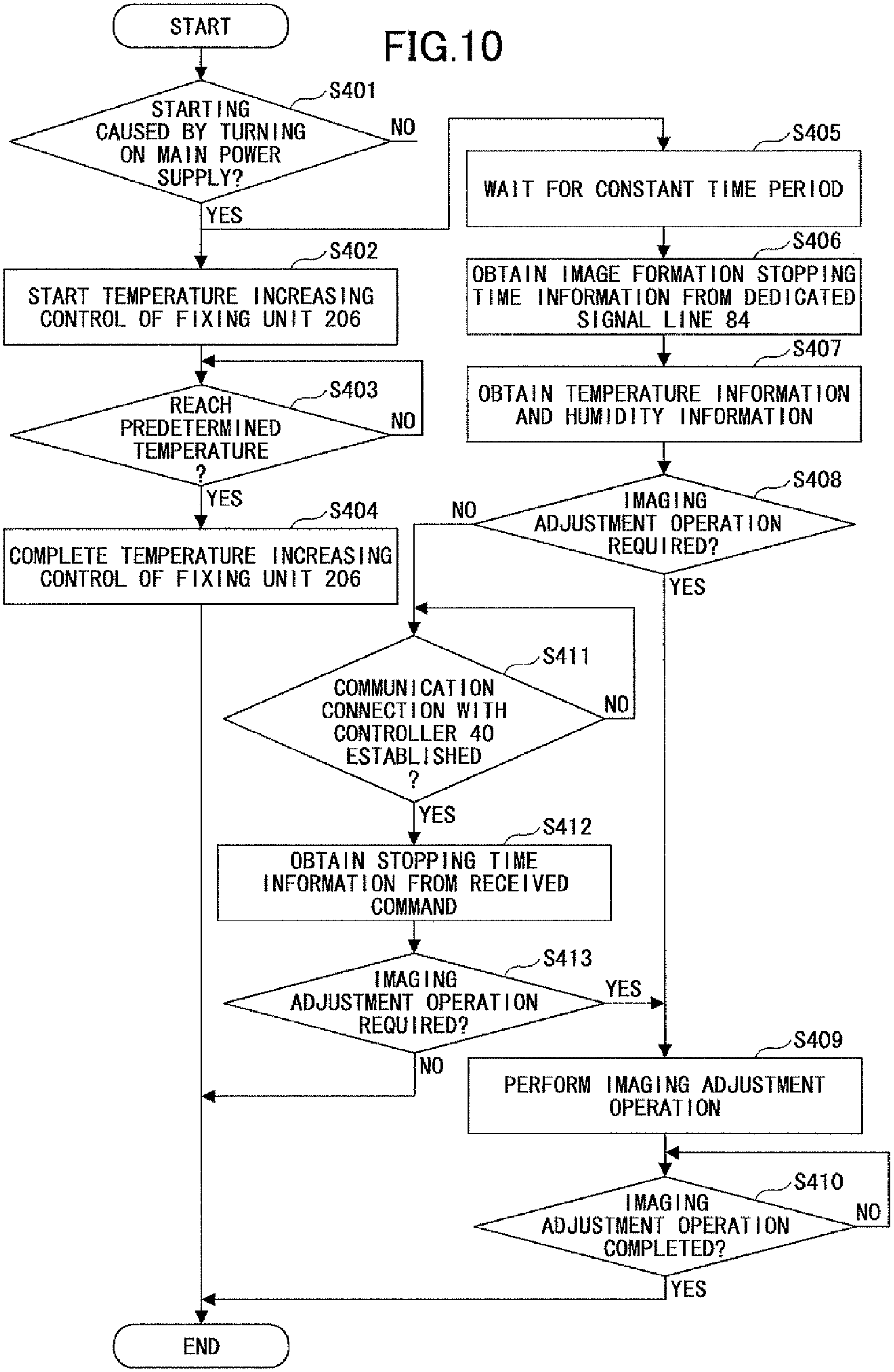
FIG. 10 is a flowchart showing a procedure of a starting process, which is performed by an engine control unit in the image forming device according to the second embodiment.

FIG. 10 is a flowchart showing a procedure of a starting process performed by the engine control unit 32 in the image forming device according to the second embodiment. Here, a starting process of the controller 40 is the same as that of the first embodiment (FIGS. 2 and 3).

The processes from S401 to S404 in FIG. 10 are the same as the processes from S301 to S304 in FIG. 4 (the first embodiment). Further, the processes from S405 to S408 in FIG. 10 are the same as the processes from S305 to S308 in FIG. 4. Further, the processes S409 and S410 that follow S408: YES in FIG. 10 are the same as the processes S309 and S310 that follow S308: YES in FIG. 4. Further, since the processes that follow S401: NO in FIG. 10 are the same as that of the first embodiment (FIG. 5), they are omitted. The difference between FIG. 4 and FIG. 10 is the processes from S411 to S413 that follow S408: NO in FIG. 10.

Namely, in the first embodiment (FIG. 4), when the engine control unit 30 determines that the imaging adjustment operation is not required (S308: NO), the starting process of the engine control unit 30 is completed, after waiting for the completion of the temperature increasing control for the fixing unit 206 (S304). On the other hand, in the second embodiment, when the engine control unit 32 determines that the imaging adjustment operation is not required (S408: NO), the engine control unit 32 performs the processes from S411 to S413.

Namely, after waiting for the establishing of the communication connection between the controller 40 and the engine control unit 32 (S411), the engine control unit 32 obtains the stopping time information from a received command (S412), and the engine control unit 32 again determines whether the imaging adjustment operation is required (S413). When the engine control unit 32 determines that the imaging adjustment operation is required (S413: YES), the engine control unit 32 performs the imaging adjustment operation (S409), and the starting process of the engine control unit 32 is completed after waiting for the completion of the imaging adjustment operation (S410: YES) and the completion of the temperature increasing control for the fixing unit 206 (S404). When the engine control unit 32 determines that the imaging adjustment operation is not required (S413: NO), the starting process of the engine control unit 32 is completed after waiting for the completion of the temperature increasing control for the fixing unit 206 (S404).

Namely, the engine control unit 32 determines again whether the imaging adjustment operation is required based on the received command, after the communication connection between the controller 40 and the engine control unit 32 is established, only if the engine control unit 32 determines that the imaging adjustment operation is not required (S408: NO), based on the stopping time information from the dedicated line 84, the information about the temperature, and the information about the humidity. By adding the control flow, a necessary imaging adjustment operation can be prevented from being omitted, even if the correct stopping time information is not obtained from the dedicated signal line 84 due to incorrect setting of the waiting time.

Third Embodiment

<Configuration of Image Forming Device>

Figure 11:
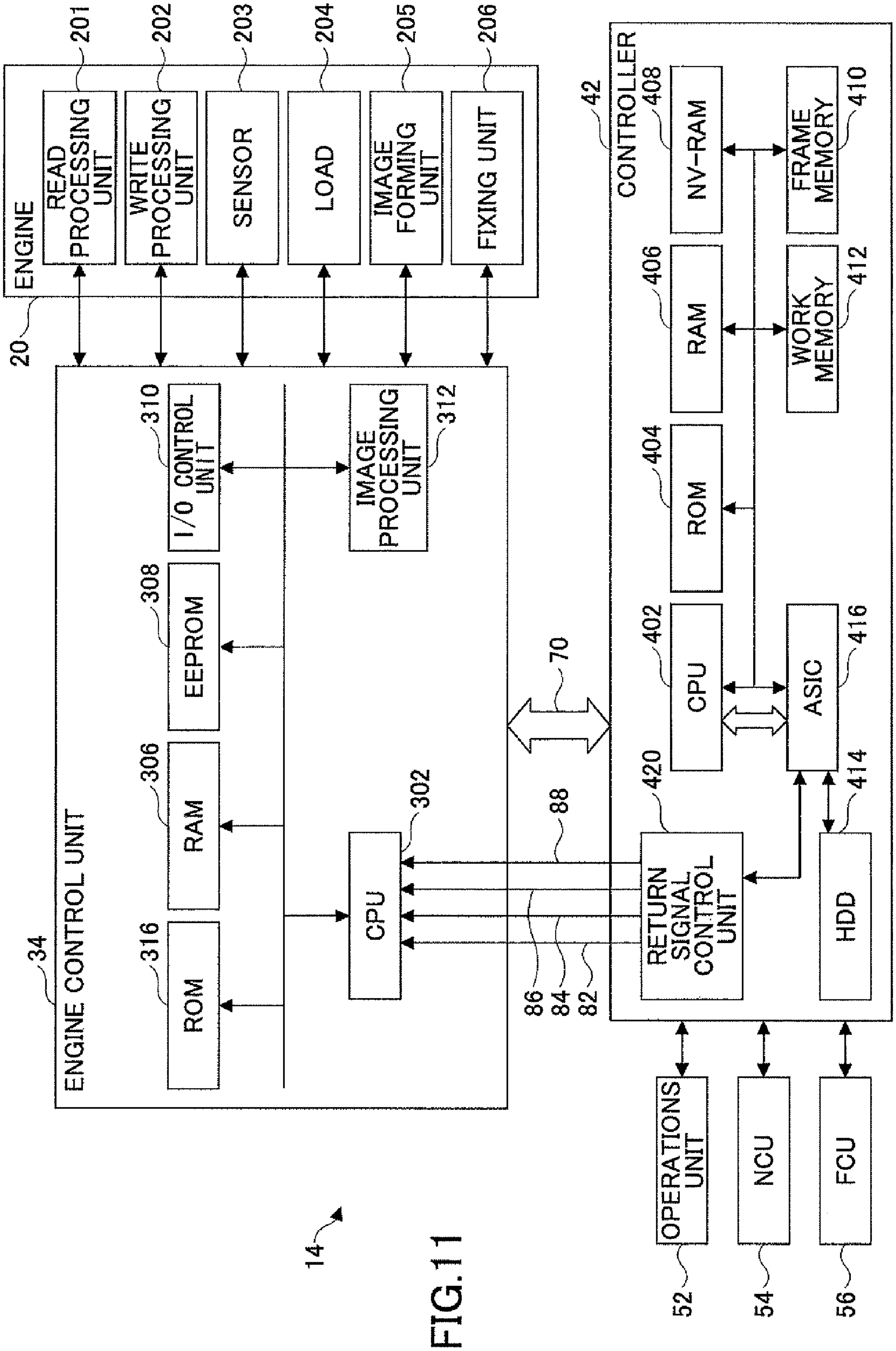
FIG. 11 is a block diagram showing a configuration of an image forming device according to a third embodiment.

FIG. 11 is a block diagram showing a configuration of an image forming device 14 according to a third embodiment. In FIG. 11, the same reference numerals as the reference numerals in FIG. 1 are used for the portions of the image forming device 14 which are the same as the corresponding portions of the image forming device 10 according to the first embodiment in FIG. 1.

The image forming device 14 according to the third embodiment has a configuration similar to that of the image forming device 10 according to the first embodiment. However, configurations of a controller 42 and an engine control unit 34 in the third embodiment are slightly different from those of the first embodiment. Namely, the return signal control unit 418 in the controller 40 of the first embodiment includes the dedicated signal lines 82, 84, and 86. On the other hand, a return signal control unit 420 in the controller 42 of the third embodiment includes a dedicated signal line 88, in addition to the dedicated signal lines 82, 84, and 86. The dedicated signal line 88 outputs information indicating that the stopping time information output from the dedicated line 84 has been fixed. Further, the engine control unit 34 includes a ROM 316 that stores a second start-up program. The second start-up program stored in the ROM 316 is different from the programs stored in the ROM 304 of the first embodiment. Other configurations of the third embodiment are the same as that of the first embodiment.

The information output from the dedicated line 88 is as follows. Namely, a low level signal output from the dedicated line 88 indicates, for example, that the content output from the dedicated signal line 84, namely, the stopping time information is not fixed yet. On the other hand, a high level signal output from the dedicated line 88 indicates, for example, that the stopping time information has been fixed. The signal output from the dedicated line 88 is input to an external interrupt port of the CPU 302 in the engine control unit 34.

<Starting Process of Image Forming Device>

Figure 12:
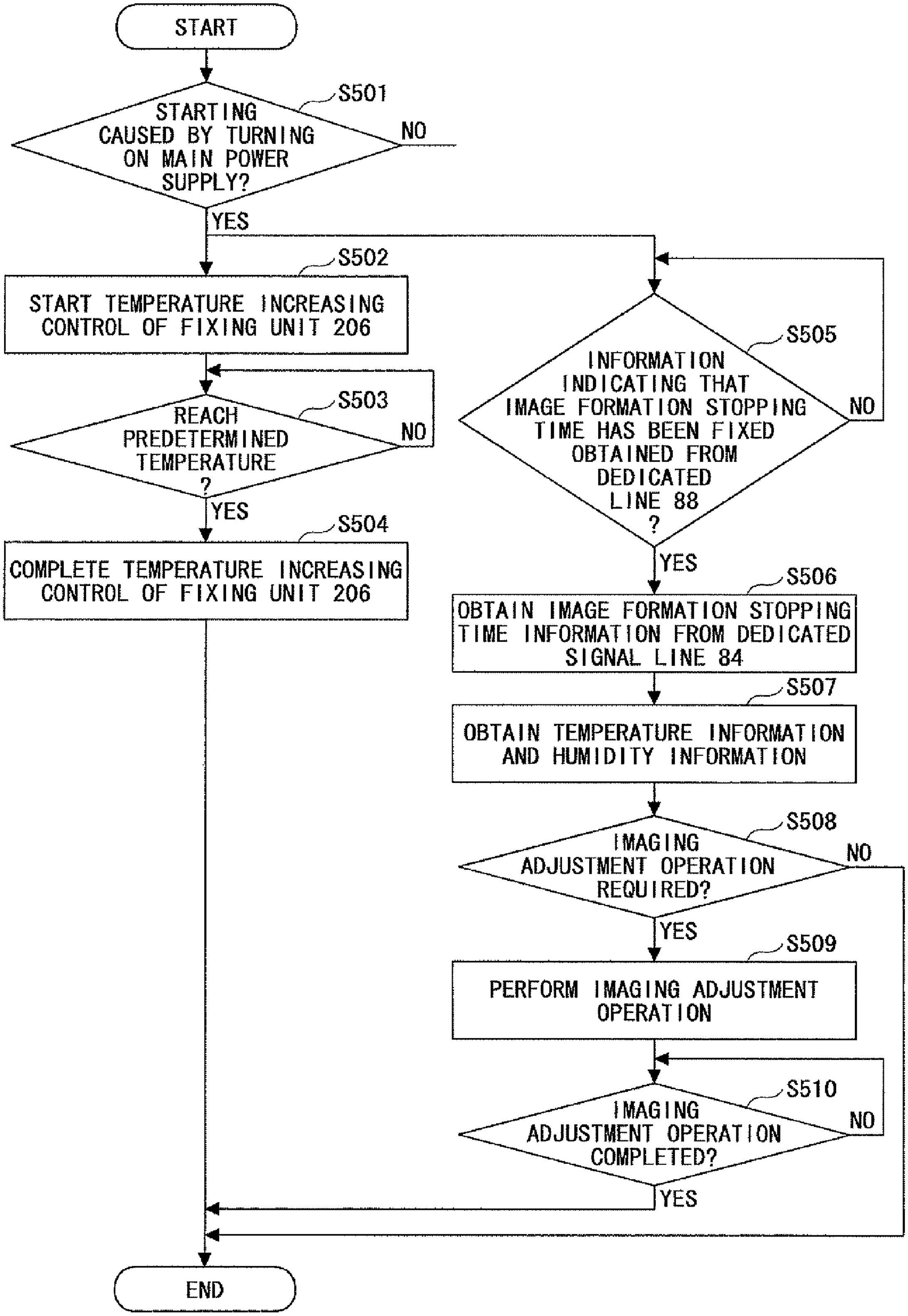
FIG. 12 is a flowchart showing a procedure of a starting process, which is performed by an engine unit in the image forming device according to the third embodiment.

FIG. 12 is a flowchart showing a procedure of a starting process performed by the engine control unit 34 in the image forming device 14 according to the third embodiment.

In FIG. 12, the processes from S501 to S504 are the same as the processes from S301 to S304 in FIG. 4 (the first embodiment). Further, the processes from S506 to S510 in FIG. 12 are the same as the processes from S306 to S310 in FIG. 4. Further, since the processes that follow S501: NO in FIG. 12 are the same as that of the first embodiment (FIG. 5), they are omitted. The difference between FIG. 4 and FIG. 12 is the process S505 in FIG. 12.

Namely, in the first embodiment (FIG. 4), the engine control unit 30 waits for the constant time period (S305), and subsequently the engine control unit 30 reads out the stopping time information (S306). On the other hand, in the third embodiment, the engine control unit 34 waits for receiving the information indicating that the stopping time information has been fixed (S505), and the engine control unit 34 reads out the stopping time information, after receiving (obtaining) the information (S506).

According to the third embodiment, the accurate stopping time information can be obtained, as quickly as possible.

The present invention is not limited to the specifically disclosed embodiments, and variations and modifications may be made without departing from the scope of the present invention.

The present application is based on Japanese Priority Applications No. 2011-061714 filed on Mar. 18, 2011, and No. 2011-260575 filed on Nov. 29, 2011, the entire contents of which are hereby incorporated herein by reference.

What is claimed is:

1. An image forming device comprising:

an engine unit configured to perform mechanical operations of image processing;

an engine control unit configured to control the operations of the engine unit; and a controller configured to generate a plurality of items of starting information required for a starting process of the engine control unit, and configured to transmit the plurality of items of the starting information to the engine control unit using a plurality of information transmission units, wherein the plurality of information transmission units do not require establishing communication connections and the plurality of information transmission units are dedicated for the plurality of items of starting information, wherein the controller transmits a first item of the starting information indicating a cause of the starting process using a first information transmission unit, and the controller transmits a second item of the starting information using a second information transmission unit when a content of the second item of the starting information is fixed, the first item of the starting information and the second item of the starting information being included in the plurality of items of the starting information, wherein a time period required for fixing the content of the second item of the starting information depends on the cause of the starting process, and wherein the engine control unit obtains the second item of the starting information using the second information transmission unit, based on the first item of the starting information obtained by using the first information transmission unit and timing information indicating a timing at which the second item of the starting information is expected to be fixed, the timing information being obtained in advance.

2. The image forming device according to claim 1, wherein the second item of the starting information is elapsed time information indicating whether an elapsed time since previous completion of an image forming operation of the engine unit reaches a predetermined time period, and wherein, when the elapsed time information indicates that the elapsed time reaches the predetermined time period, the engine control unit controls an imaging adjustment in the engine unit.

3. The image forming device according to claim 2, wherein the imaging adjustment is an adjustment of a density or an adjustment of a position of an image formed on a recording paper by the engine unit.

4. The image forming device according to claim 2, wherein the image forming device further includes a communication unit between the controller and the engine control unit that requires establishing a communication connection, and wherein, when the cause of the starting process indicated by the first item of the starting information is returning of an operation mode of the image forming device from an energy saving mode to a normal operation mode, the engine control unit performs an advance start-up for starting a temperature increasing control for a fixing unit included in the engine unit, prior to the communication connection of the communication unit being established.

5. The image forming device according to claim 4, wherein the image forming device further includes a mode selection unit configured to set whether the advance start-up is performed, based on an instruction of an operator.

6. The image forming device according to claim 5, wherein the controller transmits a third item of the starting information indicating whether the cause of the starting process is a return request from a network, using a third information transmission unit, the third item of the starting information being included in the plurality of items of the starting information, and wherein, when the cause of the starting process is the return request from the network and the operation mode of the image forming device is set to a mode for performing the advance start-up, the engine control unit determines whether the imaging adjustment in the engine unit is to be performed, based on the second item of the starting information obtained from the second information transmission unit.

7. The image forming device according to claim 2, wherein the image forming device further includes a communication unit between the controller and the engine control unit that requires establishing of a communication connection, and wherein, when the engine control unit determines that the imaging adjustment in the engine unit is not performed, based on the elapsed time information obtained by the second information transmission unit, the engine control unit reacquires the elapsed time information using the communication unit and redetermines whether the imaging adjustment in the engine unit is performed.

8. The image forming device according to claim 1, wherein the controller is configured to transmit a fourth item of the starting information using a fourth information transmission unit, the fourth item of the starting information indicating that the second item of the starting information is fixed, and wherein, when the engine control unit obtains the fourth item of the starting information using the fourth information transmission unit, the engine control unit obtains the second item of the starting information using the second information transmission unit.

9. A starting method of an image forming device, wherein the image forming device includes an engine unit configured to perform mechanical operations of image processing;

an engine control unit configured to control the operations of the engine unit; and a controller configured to generate a plurality of items of starting information required for a starting process of the engine control unit, and configured to transmit the plurality of items of the starting information to the engine control unit using a plurality of information transmission units, wherein the plurality of information transmission units do not require establishing communication connections and the plurality of information transmission units are dedicated for the plurality of items of starting information, wherein the starting method comprises:

a first transmission step, by the controller, of transmitting a first item of the starting information indicating a cause of the starting process using a first information transmission unit, the first item of the starting information being included in the plurality of items of the starting information;

a second transmission step, by the controller, of transmitting a second item of the starting information using a second information transmission unit when a content of the second item of the starting information is fixed, wherein a time period required for fixing the content of the second item of the starting information depends on the cause of the starting process;

a first acquisition step, by the engine control unit, of acquiring the first item of the starting information using the first information transmission unit; and a second acquisition step, by the engine control unit, of acquiring the second item of the starting information from the second information transmission unit, based on the first item of the starting information acquired by using the first information transmission unit and timing information indicating a timing at which the second item of the starting information is expected to be fixed, the timing information being acquired in advance.

* * * * *